(12) United States Patent
Roth

(10) Patent No.: US 6,279,857 B1
(45) Date of Patent: Aug. 28, 2001

(54) SILICON THERMAL CONTROL BLANKET

(75) Inventor: James A. Roth, Redondo Beach, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/558,276

(22) Filed: Apr. 25, 2000

(51) Int. Cl.[7] .................................................. B64G 1/22
(52) U.S. Cl. .......................... 244/173; 244/121; 244/133
(58) Field of Search ............................ 244/158 R, 163, 244/133, 117 A, 121, 173; 136/259; 428/247, 902; 117/84; 126/270

(56) References Cited

U.S. PATENT DOCUMENTS

| | | | |
|---|---|---|---|
| 4,122,239 | * 10/1978 | Riboulet et al. | 126/270 |
| 4,321,299 | * 3/1982 | Frazer | 428/247 |
| 5,373,305 | * 12/1994 | Lepore, Jr. et al. | 343/909 |
| 5,402,749 | * 4/1995 | Sexton et al. | 117/84 |
| 5,626,951 | * 5/1997 | Hogenson | 428/902 |
| 5,707,459 | * 1/1998 | Itoyama et al. | 136/259 |
| 5,981,867 | * 11/1999 | Toyama et al. | 136/259 |

* cited by examiner

*Primary Examiner*—Galen L. Barefoot

(57) ABSTRACT

A thermal blanket (28) for use in connection with a spacecraft (10) or spacecraft component for providing a thermal control coating. The thermal blanket (28) includes a plastic substrate (22) on which is deposited a silicon film (24) by a vacuum deposition process. The silicon film (24) provides a relatively high infrared light transmission and moderate absorption of high energy bandwidths in the solar spectrum that allows for the reflectance of high energy visible light and the emittance of infrared radiation. Additionally, the silicon film (24) is a hard, robust coating that provides resistance to humidity and other corrosive environments.

12 Claims, 2 Drawing Sheets

SILICON THERMAL CONTROL BLANKET

BACKGROUND OF THE INVENTION

1. Field of the Invention

This invention relates generally to a passive thermal control coating for a spacecraft and, more particularly, to a thermal blanket for a spacecraft that includes an outer coating of silicon sputtered on a substrate.

2. Discussion of the Related Art

Spacecraft typically employ many sensitive and expensive components for performing various space functions, such as information transmission and optical imaging. When in space, the spacecraft is subjected to thermal radiation from the sun which heats the spacecraft and its components to a very high temperature which may damage the spacecraft. Visible light is the main source of thermal energy in the space environment. Therefore, it has heretofore been known in the art to provide thermal control coatings, commonly referred to as thermal blankets, over sensitive spacecraft components to reflect and emit harmful solar radiation to prevent these components from being excessively heated.

Thermal control of a spacecraft is typically provided by radiating heat from the external spacecraft surfaces. The solar heating and cooling of the spacecraft is determined by the quantity of energy absorbed and the quantity of energy emitted by the spacecraft. The bulk of the energy absorbed by the spacecraft when it is in space is from the peak of the solar radiation spectrum, which has a wavelength of approximately 400–600 nm. The bulk of the energy emitted is from the infrared spectrum, at wavelengths greater than 1000 nm. The applicable equation for solar heating is provided by:

$$aS_1E_0 - eS_2sT^4, \quad (1)$$

where a is the solar absorbance of the spacecraft surface, $S_1$ is the solar absorbing area, $E_0$ is the solar irradiance, s is the emittance of the spacecraft surface, $S_2$ is the emittance area, s is the Stefan-Boltzman constant and T is temperature (absolute).

One known thermal blanket used for this purpose is a silvered Teflon laminate. Particularly, a plastic substrate made of Kapton, having a thickness of approximately 2 mils, provides strength and high emittance for use as a cold-biased single layer closeout. A polyester adhesive layer is deposited on the Kapton substrate to approximately 1.5 mils thick. Next, an Inconel layer is deposited on the adhesive layer to approximately 300 angstroms thick. A silver layer is then vacuum deposited on the Inconel layer to about 1350 angstroms thick. The outer layer is a five mil thick FEP type "A" Teflon. This configuration is effective in providing the desired solar absorbance and emittance to minimize solar heating and temperatures. However, thermal blankets of this type are made of expensive materials and are difficult to fabricate.

Another known thermal blanket for this purpose is a plastic sheet, such as Kapton, sputtered coated with a thin germanium film. The germanium film provides a desirable reflectance characteristic for reflecting visible light. The plastic sheet provides a desirable emissive characteristic for emitting infrared radiation that also acts to keep the heat from passing through the blanket. Generally, the germanium is sputtered onto the plastic sheet using known vacuum deposition processes. In an alternate version of this technique for thermal control, the plastic layer is painted onto the spacecraft surface, and then the germanium layer is vacuumed deposited on the painted plastic layer.

Prior to being attached to a spacecraft, large sheets of the germanium coated plastic are rolled up for storage. When a piece of thermal blanket is needed, it is cut to length and attached to the desirable spacecraft component. During the storage time, it has been found that germanium suffers from corrosive degradation when exposed to humidity. The corrosive degradation causes pitting of the germanium film and causes a haze to cover the film. This degradation effects the reflective and emissive characteristics of the sheet, often rendering it useless for its intended purpose. The thermal coating can be stored in an unrolled condition or in a controlled environment in an attempt to prevent such degradation, but these fixes also add cost.

What is needed is a thermal blanket for use in connection with a spacecraft or spacecraft component that does not suffer from corrosive degradation when in storage and is relatively inexpensive. It is therefore an object of the present invention to provide such a thermal blanket.

SUMMARY OF THE INVENTION

In accordance with the teachings of the present invention, a thermal blanket is disclosed for providing a thermal control coating to a spacecraft or spacecraft components. The thermal blanket includes a substrate on which is deposited a silicon film by a vacuum deposition process. The silicon film provides a relatively high infrared light transmission and moderate absorption of high energy bandwidths in the solar spectrum that allows for the reflectance of high energy visible light and the emittance of infrared radiation. Additionally, the silicon film is a hard, robust coating that provides resistance to humidity and other corrosive environments.

Additional objects, advantages and features of the present invention will become apparent to those skilled in the art from the following discussion and the accompanying drawings and claims.

DETAILED DESCRIPTION OF THE PREFERRED EMBODIMENTS

The following discussion of the preferred embodiments directed to a thermal control blanket including a vacuum deposited silicon film is merely exemplary in nature, and is in no way intended to limit the invention or its applications or uses. For example, the discussion below is directed to using the thermal blanket for passive thermal control on a spacecraft. However, the thermal blanket may be used for passive thermal control in other applications. The term "thermal blanket" as used herein shall mean a covering for a surface and can take many forms as illustrated herein.

Figure 1:
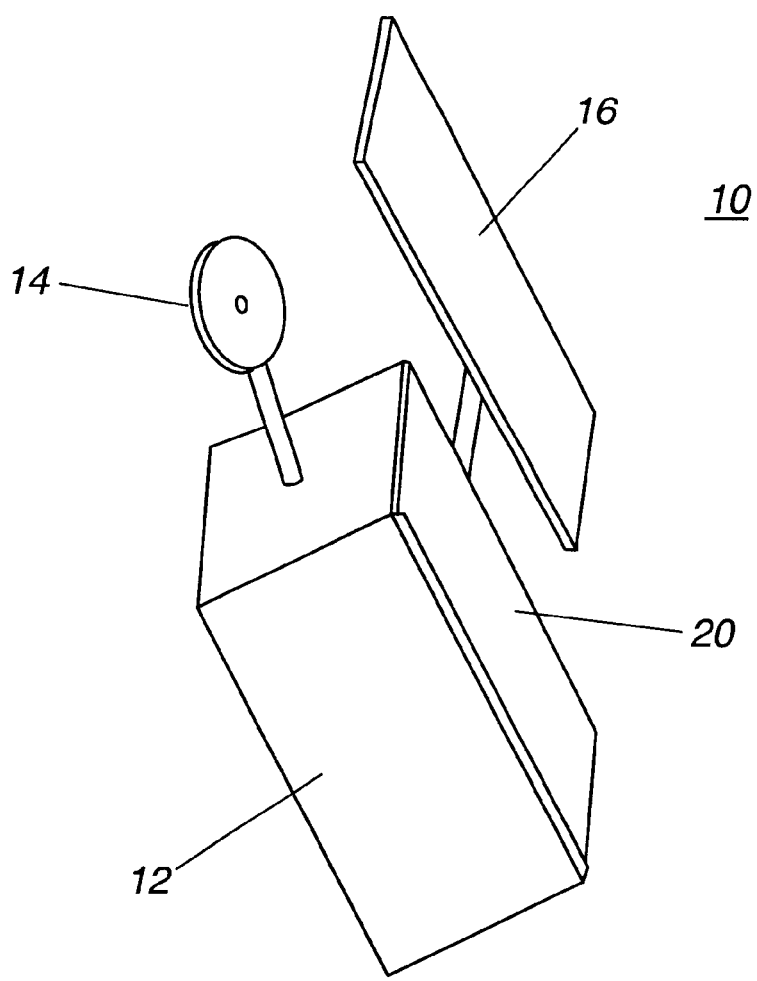
FIG. 1 is a perspective view of a spacecraft including a thermal control blanket, according to an embodiment of the present invention.

FIG. 1 is a perspective view of a spacecraft 10 including a spacecraft body 12, an antenna 14 and a solar array 16. The spacecraft 10 is directed towards the sunlight so that the sunlight hits a passive thermal control blanket 20 on the sun side of the satellite body 12. The blanket 20 provides a thermal control coating for protecting the spacecraft body 12 from heat. The blanket 20 can also be used to cover other parts of the spacecraft 10. The spacecraft 10 is heated by the absorbed energy (I) from the sunlight, and is cooled by emitted energy (M) therefrom. The blanket 20 is shown as a discrete covering applied to the body 12 (e.g., with adhesive), but it can also be painted on the body 12.

Figure 2:
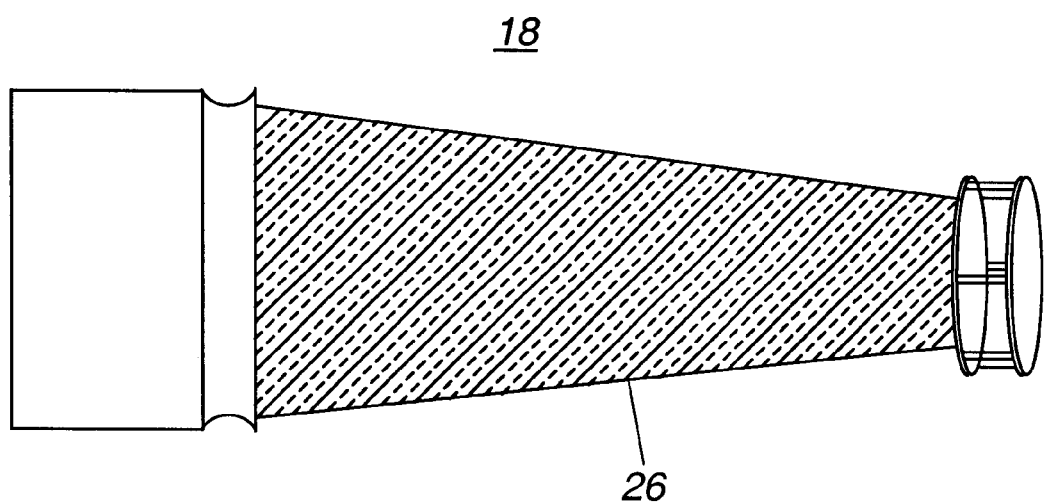
FIG. 2 is a pictoral illustration of a space telescope including a thermal control blanket, according to another embodiment of the present invention.

FIG. 2 is an illustration of a space telescope 18 including a passive thermal control blanket 26 in the form of a sheet wrapped around the body of the telescope 18. The thermal blanket 26 provides thermal control for protecting the space telescope 18 from heat in the same manner as the blanket 20.

Figure 3:
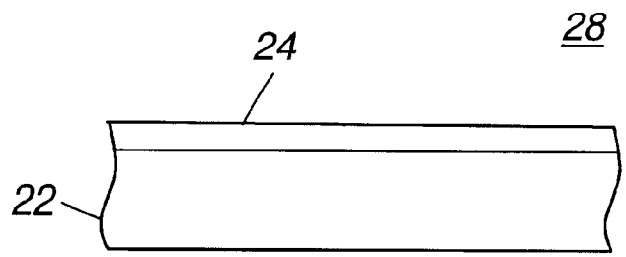
FIG. 3 is a broken-away, cross-sectional view of a thermal control blanket removed from the spacecraft, according to the invention.
Figure 4:
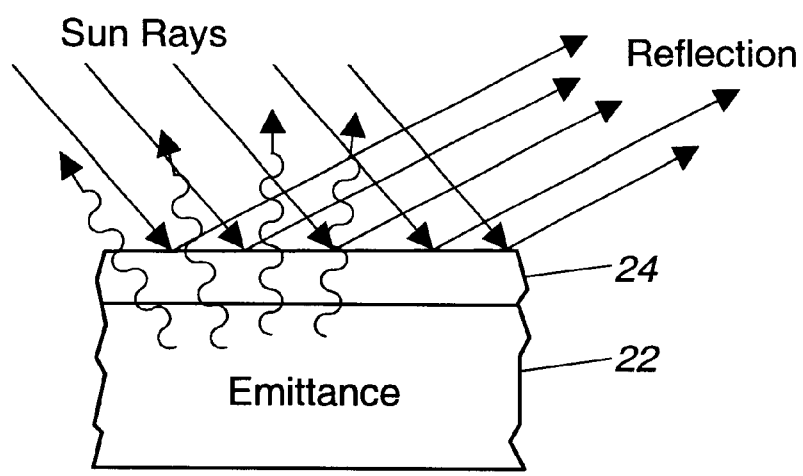
FIG. 4 is a broken-away, cross-sectional view of the thermal control blanket shown in FIG. 3 showing thermal energy being reflected and emitted therefrom.

FIG. 3 is a broken-away, cross-sectional view of a passive thermal control blanket 28 of the type discussed herein. The thermal blanket 28 includes a plastic substrate layer 22 on which is deposited a silicon coating 24. The silicon coating 24 is deposited on the plastic substrate 22 by any suitable vacuum deposition process, such as sputtering, well known to those skilled in the art. In one embodiment, the silicon coating 24 has a thickness of between 500 and 3000 angstroms to provide the desirable reflective and emissive qualities for IR and visible radiation. FIG. 4 shows the reflective and emissive properties of the thermal blanket 28. The substrate layer 22 has a thickness of about 1–2 mils, and can be made of any suitable plastic for the purposes described herein, such as Kapton.

The silicon coating 24 provides desirable reflection, absorption and emissive properties for use as a control surface on the spacecraft 10. The silicon coating 24 has a relatively high infrared light transmission and moderate absorption of high energy bandwidths in the visible solar spectrum. This allows for the reflectance of high energy visible light and the emittance of infrared radiation through the substrate layer 22. Additionally, the silicon coating 24 provides a hard, robust coating that is resistant to humidity and corrosive environments. The coating 24 reduces solar absorption and allows for heat emittance which enables passive thermal control of surfaces exposed to thermal radiation. Additionally, the thermal blanket 28 is lightweight.

The silicon coating 24 also provides a number of other beneficial features. The silicon is resistant to atomic oxygen, resistant to solar radiation damage, provides sufficient electrical conduction to prevent electrostatic discharge, is resistant to terrestrial corrosion, and provides an excellent adhesion to Kapton.

The use of a silicon coating in combination with a Kapton substrate for passive thermal control can also be extended to the use of silicon in combination with other coating layers. For example, the combination of germanium and silicon, where the silicon layer is on the outside, can also be used. Additionally, sandwiching a germanium layer between two silicon layers deposited on the substrate layer 22 can be used. Additionally, a combination of silicon, germanium and silicon dioxide can also be used. However, the use of silicon alone has achieved the best results. Table 1 below gives test results for various combinations of silicon, germanium and silicon dioxide. This table includes the layer thicknesses, the total thickness of the combination of layers, and the absorption ( ) and emittance ($\epsilon$) of the combination of layers.

TABLE 1

| Si (Å) | Ge (Å) | Si (Å) | SiO$_2$ (Å) | Total Thickness (Å) | $\alpha$ | $\epsilon$ |
|---|---|---|---|---|---|---|
| 0 | 1056 | 0 | 0 | 1056 | 0.576 | 0.795 |
| 0 | 1050 | 340 | 0 | 1350 | 0.491 | 0.723 |
| 340 | 1000 | 170 | 0 | 1510 | 0.56 | 0.72 |
| 1350 | 0 | 0 | 0 | 1350 | 0.486 | 0.762 |
| 0 | 1900 | 0 | 0 | 1900 | 0.525 | 0.643 |
| 0 | 1500 | 0 | 0 | 1500 | 0.51 | 0.685 |
| 1100 | 600 | 0 | 0 | 1700 | 0.43 | 0.732 |
| 465 | 1100 | 0 | 385 | 1950 | 0.56 | 0.695 |
| 0 | 900 | 0 | 200 | 1100 | 0.525 | 0.77 |

Figure 5:
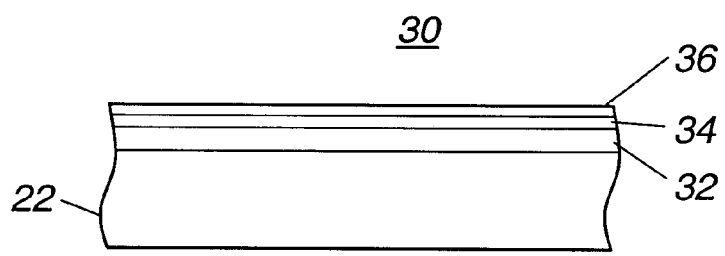
FIG. 5 is a broken-away, cross-sectional view of a thermal control blanket including a film of silicon and other layers, according to still another embodiment of the present invention.

FIG. 5 shows a broken-away, cross-sectional view of a thermal blanket 30 including the Kapton substrate layer 22 and three control coating layers 32, 34 and 36, according to another embodiment of the present invention. The blanket 30 can replace the blanket 28 on the spacecraft for certain applications. The control coating layers 32–36 can be any combination of the layers suggested herein, for example, silicon-germanium-silicon or silicon-germanium-silicon dioxide.

The foregoing discussion discloses and describes merely exemplary embodiments of the present invention. One skilled in the art would readily recognize that various changes, modifications and variations can be made therein without departing from the spirit and scope of the invention as defined in the following claims.

What is claimed is:

1. A passive thermal control blanket, said blanket comprising:
    a substrate; and
    a silicon coating on the substrate, said substrate and the silicon coating providing the blanket with preselected emittive characteristics for infrared energy and reflective characteristics for visible light to provide thermal control for an object covered thereby.

2. The blanket according to claim 1 wherein the object is a spacecraft and the silicon coating has a thickness between 500 and 3000 angstroms.

3. The blanket according to claim 1 further comprising intermediate layers of germanium or silicon dioxide sandwiched between the substrate and the silicon coating.

4. The blanket according to claim 1 wherein the substrate is a plastic substrate.

5. The blanket according to claim 1 wherein the blanket is in the form of a flexible sheet which can be wrapped around the object.

6. A passive thermal control blanket for use in connection with a spacecraft, said blanket comprising:
    a plastic substrate; and
    a silicon coating deposited on the substrate to a thickness of between 500–3000 angstroms by a vacuum deposition process, said substrate and the silicon coating providing the blanket with preselected emittive characteristics for infrared energy and reflective characteristics for visible light to provide thermal control for the spacecraft.

7. The blanket according to claim 6 further comprising intermediate layers of germanium or silicon dioxide sandwiched between the substrate and the silicon coating.

8. The blanket according to claim 6 wherein the blanket is in the form of a flexible sheet which can be wrapped around the spacecraft.

9. A method of protecting a spacecraft body from heat, said method comprising the step of:
   vacuum depositing a silicon coating on a substrate to form a thermal control blanket; and
   covering the spacecraft body so that the silicon coating is on an outside surface of the blanket.

10. The method according to claim 9 wherein the silicon coating is deposited onto the substrate to a thickness of between 500 and 3000 angstroms.

11. The method according to claim 9 which further comprises vacuum depositing a germanium layer or a silicon dioxide layer on the substrate between the silicon coating and the substrate.

12. The method of claim 9 wherein the substrate is a flexible plastic sheet and wherein the spacecraft body is wrapped within the blanket.

* * * * *